US 9,440,615 B2

(12) United States Patent
Jordan et al.

(10) Patent No.: US 9,440,615 B2
(45) Date of Patent: Sep. 13, 2016

(54) INITIATOR ASSEMBLIES

(71) Applicants: Michael P. Jordan, South Weber, UT (US); Bradley W. Smith, Plain City, UT (US); Jeff Kida, Layton, UT (US)

(72) Inventors: Michael P. Jordan, South Weber, UT (US); Bradley W. Smith, Plain City, UT (US); Jeff Kida, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 14/565,957

(22) Filed: Dec. 10, 2014

(65) Prior Publication Data

US 2016/0167618 A1   Jun. 16, 2016

(51) Int. Cl.
*B60R 21/264* (2006.01)
*B60R 21/268* (2011.01)

(52) U.S. Cl.
CPC ......... *B60R 21/2644* (2013.01); *B60R 21/268* (2013.01)

(58) Field of Classification Search
CPC ......................... B60R 21/2664; B60R 21/268
See application file for complete search history.

(56) References Cited

U.S. PATENT DOCUMENTS

| | | | | |
|---|---|---|---|---|
| 5,645,298 A * | 7/1997 | Stevens | ............... | B60R 21/2644 102/531 |
| 5,882,036 A | 3/1999 | Moore et al. | | |
| 6,474,684 B1 * | 11/2002 | Ludwig | ............... | B60R 21/2644 280/736 |
| 6,543,806 B1 | 4/2003 | Fink | | |
| 6,763,764 B2 | 7/2004 | Avetisian et al. | | |
| 7,124,688 B2 | 10/2006 | Avetisian et al. | | |
| 7,290,797 B2 | 11/2007 | Lang et al. | | |
| 7,401,810 B2 * | 7/2008 | Brisighella, Jr. | ....... | B60R 21/26 280/736 |
| 2002/0069783 A1 | 6/2002 | Avetisian et al. | | |
| 2002/0174792 A1 * | 11/2002 | Kubozuka | ............ | B60R 21/2644 102/202.12 |
| 2003/0154876 A1 | 8/2003 | Avetisian et al. | | |
| 2003/0213398 A1 * | 11/2003 | Shilliday | ........... | B60R 21/23138 102/531 |
| 2005/0123406 A1 * | 6/2005 | Clark | ................... | B60R 21/2644 417/52 |
| 2005/0212272 A1 * | 9/2005 | Fogle, Jr. | ............... | B60R 21/268 280/737 |
| 2006/0137559 A1 | 6/2006 | Mavrakis et al. | | |
| 2007/0257476 A1 * | 11/2007 | Green | ................... | B60R 21/268 280/737 |
| 2008/0143090 A1 * | 6/2008 | Pack | ................... | B60R 21/2644 280/741 |
| 2011/0101651 A1 * | 5/2011 | Bierwirth | ............ | B60R 21/2644 280/728.2 |

FOREIGN PATENT DOCUMENTS

FR            2 874 686         3/2006
WO   WO 2006/021491 A1    3/2006

OTHER PUBLICATIONS

R.J. Digiantonio, "Two-Shot Molding of Thermoplastic Elastomers", Plastics 101, Society of Plastic Engineers ANTEC '92, Detroit, Michigan, May 1992.

* cited by examiner

*Primary Examiner* — Darlene Condra
(74) *Attorney, Agent, or Firm* — Pauley Erickson & Rottis (57) ABSTRACT

An initiator assembly for placement in an associated opening in an initiator-containing device includes an initiator device having at least one igniter element and an elastomeric overmoulding. The initiator device includes at least one of a thermoplastic initiator base and a thermoplastic adapter integrally joined to a base of the initiator-containing device. The elastomeric overmoulding is integral with at least one structural component such as the initiator base, the adapter and the base of the initiator-containing device. The elastomeric overmoulding serves to sealingly mate the initiator assembly in an initiator-accepting opening in the initiator-containing device. Also provided are corresponding methods of making an initiator assembly.

20 Claims, 7 Drawing Sheets

INITIATOR ASSEMBLIES

BACKGROUND OF THE INVENTION

1. Field of the Invention

This invention relates generally to initiator assemblies and, more particularly, to initiator assemblies having one or more integral sealing features such as to permit or facilitate placement of the initiator assembly in sealing relation with or in an associated housing or component part.

2. Discussion of Related Art

Inflatable safety restraint installations typically employ an inflator device to produce or supply inflation gas for inflating an inflatable airbag in the event of a collision. The inflator devices in such installations often include a gas generant material stored within the inflator device housing and a preformed initiator in combination with the housing such as to actuate the gas generant material to produce or supply the inflation gas. Suitable initiators typically include a reactive charge in combination with one or more electrical connectors. A signal sent through the electrical connector(s) actuates the reactive charge, which produces reaction products that actuate the gas generant material.

In practice, initiators in such applications are typically or commonly either directly joined to an inflator device or first joined to an adapter plate or the like which is then joined to the inflator device. Although initiators can, in practice, be directly joined to any selected wall of an inflator device, initiators are typically directly joined to base portions of inflator devices. Further, when an initiator is joined to an adapter plate, the adapter plate can, for example, form an inflator device base or a portion of the inflator device base.

Initiators have typically been joined to an inflator device wall or adapter plate by way of one of two techniques.

A first technique involves inserting the initiator into an appropriate machined interface and crimping the interface to secure the initiator. Such crimping requires that a precise interface be machined into the inflator device wall or adapter plate. Crimping is thus relatively expensive and at least some crimping processes can be subject to quality control problems.

A second technique involves integrally molding an initiator directly to an inflator device wall or adapter plate using a moldable material, such as a thermoplastic material. Such integral molding is typically less expensive than the crimping method mentioned above. However, integral molding processes typically faces some disadvantages as well. For example, assemblies involving such integrally molding of an initiator directly to an inflator device wall may require the addition or inclusion of an additional seal, such as in the form of an O-ring, to provide a seal between such wall in or with the associated inflator device because the thermoplastic material does not bond well to the metal inflator wall.

Thus, there remains a need for an initiator assembly that minimizes or eliminates the need for expensive and complicated machining. Further, there remains a need for an initiator assembly that desirably seals an initiator assembly with or to an associated inflator device in a simple, reliable and preferably less expensive manner.

SUMMARY OF THE INVENTION

A general object of the invention is to provide an improved initiator assembly.

A more specific objective of the invention is to overcome one or more of the problems described above.

One aspect of the invention relates to the incorporation and use of an integral elastomeric moldable material in association with various molded initiator configurations such that integral elastomeric moldable material serves to form or otherwise appropriately provide a seal to sealingly mate the initiator assembly in an initiator-accepting opening in the inflator device.

In one aspect of the invention, there is provided an initiator assembly such as for placement in an initiator-containing device. In one embodiment, such an initiator assembly includes an initiator device and an elastomeric overmoulding. The initiator device includes at least one igniter element. The initiator device includes at least one element selected from the group consisting of a thermoplastic initiator base and a thermoplastic adapter integrally joined to a base, such as of metal, of the initiator-containing device. The elastomeric overmoulding serves to sealingly mate the initiator assembly in an initiator-accepting opening in the initiator-containing device. The elastomeric overmoulding is integral with at least one structural component selected from the group consisting of the thermoplastic initiator base, the thermoplastic adapter and the base of the initiator-containing device. The elastomeric overmoulding is at least in part disposed on an outer surface of the selected structural component.

In another aspect of the invention, there is provided an improvement for or in an initiator assembly for placement in an initiator-containing device, wherein the initiator assembly includes at least one igniter element and a structural element having an outer surface. In one embodiment, such improvement is an integral elastomeric overmoulding disposed on at least a portion of the outer surface of the structural element to sealingly mate the initiator assembly in an initiator-accepting opening in the device.

In another aspect of the invention, there is provided a method of making an initiator assembly. In one embodiment, such a method involves molding an elastomeric seal about at least a portion of an outer surface of an initiator assembly structural element. The elastomeric seal serves or acts to sealingly mate the initiator assembly in an initiator-accepting opening in an initiator-containing device.

As used herein, references to items being "integral" or "integrally joined" are to be understood to generally refer to items formed in one part without further assembly requirements or in the case of a part formed via mold processing, being formed in one molding shot.

While the broader practice of the invention is not necessarily limited to specific or particular types or forms of initiator assemblies, the invention is believed to have particular beneficial applicability in or with an initiator configuration or type selected from the group of an Integrally Molded Initiator (IMI) configuration, pin type initiator and/or Molded into Base (MIB) initiator configuration.

Other objects and advantages will be apparent to those skilled in the art from the following detailed description taken in conjunction with the appended claims and drawings.

DESCRIPTION OF PREFERRED EMBODIMENTS

As detailed further below, the invention generally provides improved initiator assemblies, particularly improved initiator assemblies such as for use or placement in an initiator-containing automotive safety restraint inflator device.

In one significant aspect of the subject development, a seal such as of an elastomeric material (such as a thermoplastic elastomer (TPE), a thermoplastic vulcanizate (TPV), or a. react in mold material such as: a liquid silicon rubber (LSR), ethelyne propylene diene monomer (EPDM), for example) is molded onto an initiator-containing component such as to provide a soft surface such as to one or more of provide, permit and/or facilitate the initiator-containing component to sealingly mate in or with a corresponding initiator-accepting opening in a initiator-containing device. Thus, whereas many previous initiator configurations required the addition of a secondary seal, such as an O-ring, to be used in association with the initiator configuration when used in an inflator device, the subject development desirably provides a seal material, such as in the form of an elastomeric material, that is integral with the initiator-containing component such that no secondary seal placement is desirably required when incorporated into a corresponding or associated initiator-containing device, such as an automotive safety restraint inflator device, for example.

Figure 1:
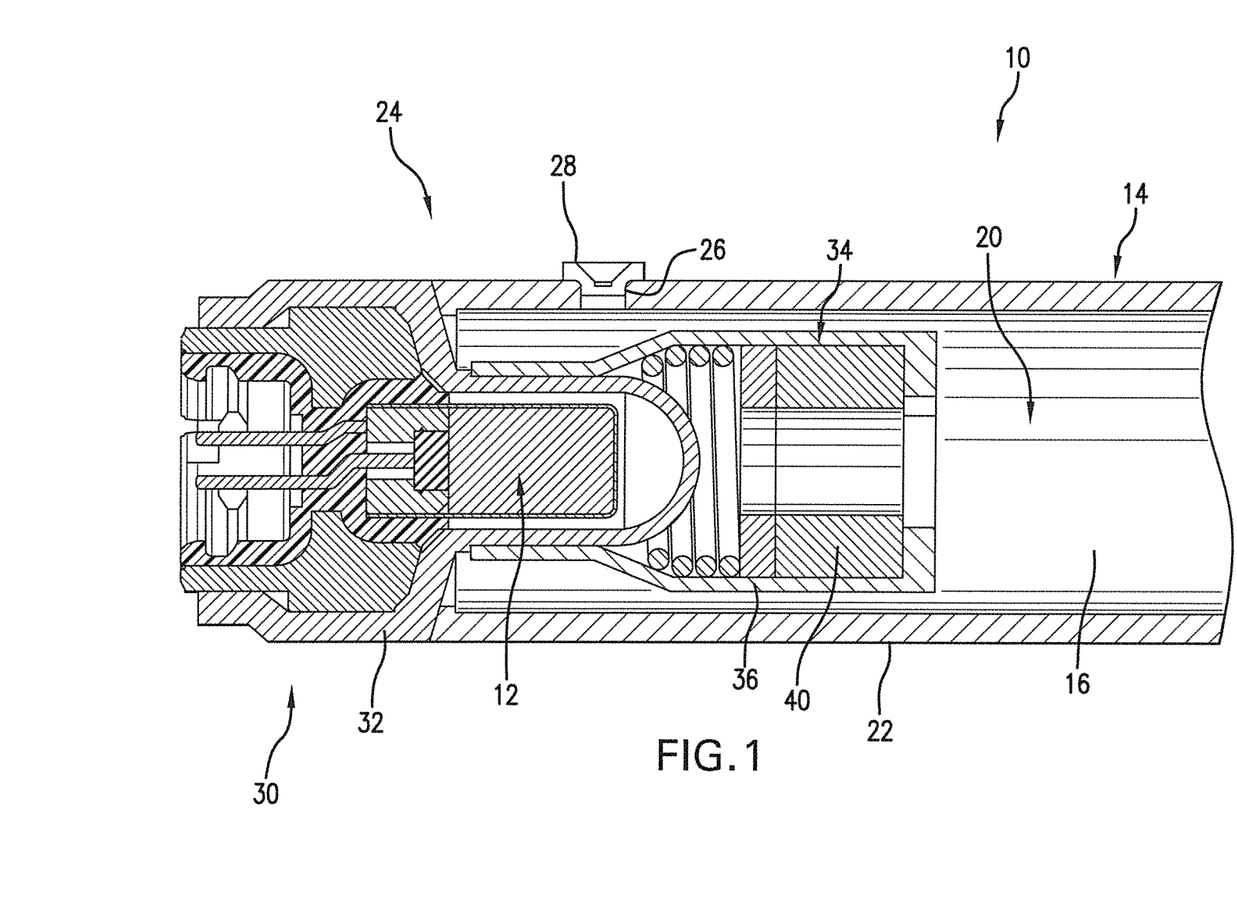
FIG. 1 is a simplified fragmentary cross sectional view of an automotive safety restraint inflator device incorporating an initiator assembly in accordance with one embodiment of the invention.
Figure 2:
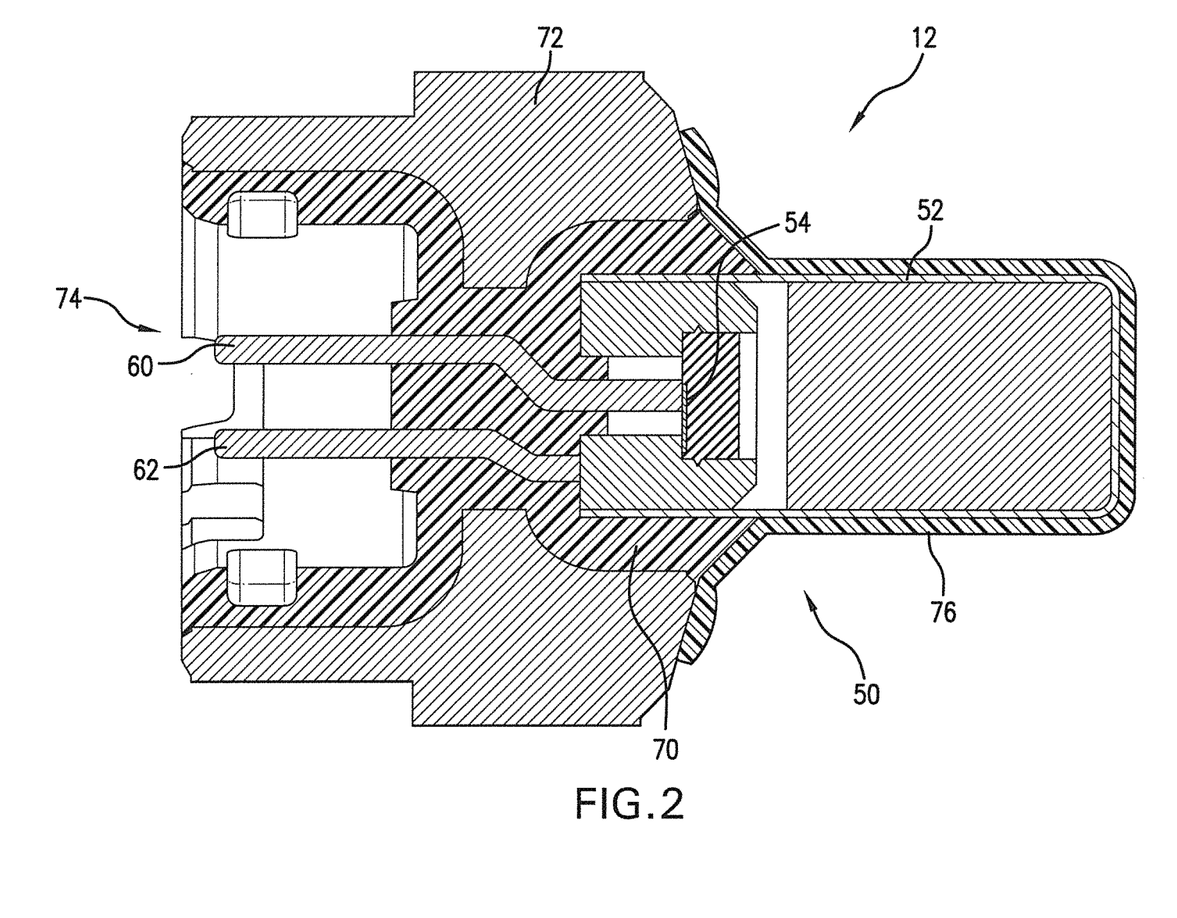
FIG. 2 is a simplified sectional side view of the initiator assembly of automotive safety restraint inflator device shown in FIG. 1.

Turning first to FIG. 1 there is illustrated an automotive safety restraint inflator device, generally designated by the reference numeral 10, incorporating an initiator assembly, generally designated by the reference numeral 12 and shown in more particular detail in FIG. 2, in accordance with one embodiment of the invention. As described in greater below, the initiator assembly 12 incorporates an initiator device of a type that is sometimes hereinafter referred to as an Integrally Molded Initiator (IMI).

The automotive safety restraint inflator device 10 is of a type commonly referred to as a hybrid inflator. Such an inflator device commonly includes a pressure vessel 14. In an at rest stage, prior to activation, the pressure vessel 14 generally serves to contain or hold a quantity of stored inflation gas 16 under pressure. The pressure vessel 14 may be formed as any container having an interior 20 to receive the stored inflation gas 16, and which is sufficiently strong to safely retain the stored gas under pressure for the desired period of time. In the illustrated embodiment shown in FIG. 1, the pressure vessel 14 is formed by a sidewall 22 such as having a generally cylindrical form with a first longitudinal end 24 and an opposed second longitudinal end (not shown), respectively. The sidewall 22 thus serves to define a longitudinal axis along its center. The sidewall 22 includes fill port or hole 26 to provide the stored inflation gas 16 to the pressure vessel interior 20. After the pressure vessel 14 has been appropriately filled with the stored inflation gas 16, the fill port or hole 24 can be appropriately closed and sealed, such as with a fill port plug 28.

The automotive safety restraint inflator device 10 includes a first end closure assembly generally designated by the reference numeral 30 such as including a first end wall 32 secured to or with the sidewall 22 at the first end 24, such as by welding or alternatively, as may be desired.

In the illustrated embodiment, the first end closure assembly 30 includes or contains the initiator assembly 12 in reaction initiating alignment and placement with a heater assembly 34. Such a heater assembly may desirably include a housing 36 containing a quantity of one or more reactive materials 40 that upon reaction produce heat, and preferably also produce gas, such as are known in the art. Thus, upon proper actuation, such heat can desirably serve to heat the stored gas 16 such as to increase the pressure within the pressure vessel 14 leading to the designed release of the stored inflation gas 16 together with produced gas, if any, from the inflator device 10 and conveyance of such released gas to an associated automotive safety restraint device (not shown).

As will be appreciated, suitable heater assemblies can take various forms and configurations and thus the broader practice of the invention is not necessarily limited to use with heater assemblies of specific or particular design, construction or operation.

The initiator assembly 12 will now be more particularly described making reference to FIG. 2.

The initiator assembly 12 includes an initiator device 50. As identified above, the initiator device 50 is of a type that is sometimes hereinafter referred to as an Integrally Molded Initiator (IMI). The initiator device 50 includes an initiator canister or cup 52. The initiator canister 52 in part defines a storage chamber for containing at least one reactive charge.

The initiator device 50 includes at least one igniter element 54, such as known in the art, and such as effective upon actuation to ignite the at least one reactive charge. Suitable such igniter elements in accordance with particular embodiments of the invention may include but are not necessarily limited to bridgewire (shown in FIG. 2), semiconductor bridge (SCB), thin film bridge, fiber optic coupled laser and direct laser diode firing signal devices.

The initiator device 50 also includes first and second electrical connectors 60 and 62 in reaction initiating communication, such as via the igniter element 54, with the reactive charge within the initiator canister 52. Upon receiving a signal through the electrical connectors 60 and 62, the reactive charge is initiated to produce reaction products that desirably rupture the initiator canister 52.

More particularly, the initiator device 50 is an integrally molded initiator (IMI) such as including a thermoplastic body 70 integrally molded to or with a metallic base or body 72. The thermoplastic body 70, also sometimes referred to as an adapter, desirably can form or include a connector socket opening 74. The connector socket opening 74 is adapted to receive an electrical receptacle for attaching to the electrical connectors 60 and 62.

The initiator assembly 12 includes an elastomeric overmoulding 76. As shown, the elastomeric overmoulding 76 can desirably be molded onto both a portion of the thermoplastic body 70 and a portion of the metallic base or body 72, as well as over the external surface of the initiator canister 52. With such embodiment, the elastomeric overmoulding 76 can not only serve to facilitate placement and positioning of the initiator assembly in sealing relationship in or with an associated inflator device but desirably also forms an initiator cover such as to further secure and safeguard the reactive materials housed or contained within the initiator canister. Additionally the overmolding 76 as shown eliminates the need for installation of an electrical insulation cover thereby further reducing component and assembly costs.

While the IMI initiator assembly 12 shown in FIG. 2 shows the elastic overmoulding 76 molded onto both a portion of the thermoplastic body 70 and a portion of the metallic base or body 72, as well as over the external surface of the initiator canister 52, those guided by the teachings herein provided will understand and appreciate that the broader practice of the invention is not necessarily so limited. For example, turning to FIG. 3 there is illustrated an IMI initiator assembly 112 in accordance with another aspect of the invention. The initiator assembly 112 is in many respect similar to the inflator assembly 12 described above. For example, the initiator assembly 112, like the initiator assembly 12 includes an initiator device 150 having an initiator canister or cup 152 that in part defines a storage chamber for containing at least one reactive charge. The reactive charge, upon initiation, produces reaction products that desirably rupture the initiator canister 152. Further, the initiator device 150 is also an integrally molded initiator (IMI) such as includes a thermoplastic body 170 integrally molded to or with a metallic base or body 172. The thermoplastic body 170, also sometimes referred to as an adapter, desirably can form or include a connector socket opening 174 such as to permit or facilitate appropriate connection or attachment with a selected electrical signal conveyance device.

Figure 3:
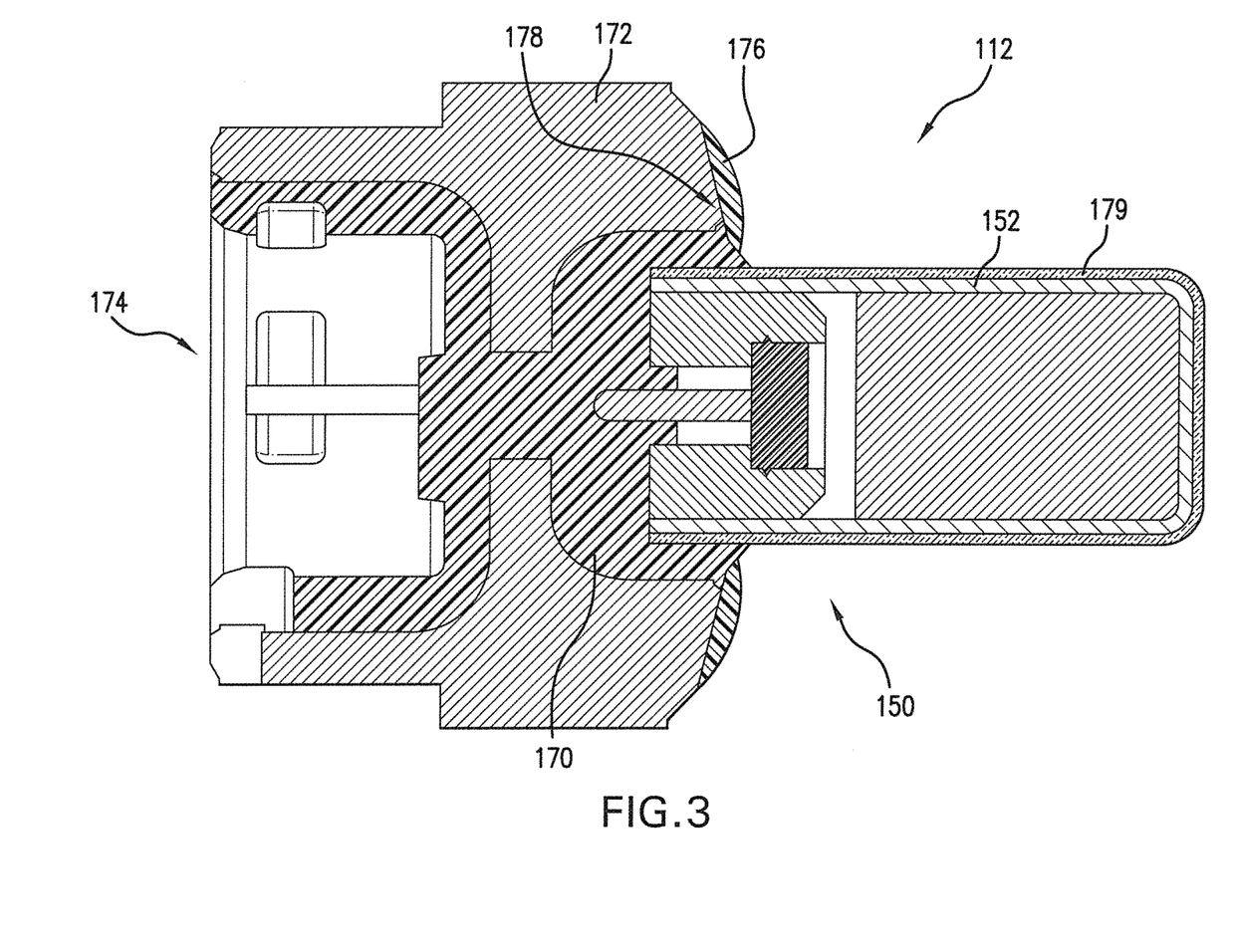
FIG. 3 is a simplified sectional side view of an initiator assembly in accordance with another aspect of the invention.

The initiator assembly 112 primarily differs from the initiator assembly 12, however, in that the elastic overmoulding 176 does not extend over the external surface of the initiator canister 152, but rather is largely focused at the otherwise exposed outer surface interface 178 between the elastomeric or plastic body 170 and the metallic base or body 172. As the elastic overmoulding does not extend over the initiator canister 152, the initiator assembly 112 also includes an electrical insulation cover 179 appropriately disposed over the initiator canister 152.

In embodiments wherein the elastomeric overmoulding is molded onto a thermoplastic portion of an IMI, the material or resin of the overmoulding and the associated portion of the IMI are desirably selected to be molding compatible and to provide or result in desired adherence to each other.

In embodiments wherein the elastomeric overmoulding is molded onto a portion of a metallic base or body or a metallic initiator canister of an IMI, material selection can be appropriately based on facilitating or assisting on desired bonding to the particular metal surface. Furthermore, those skilled in the art and guided by the teachings herein provided will understand and appreciate that for other applications such as where material incompatibility may cause or result in a lack of desired bonding, e.g., chemical bonding, mechanical locking can be applied.

Figure 4:
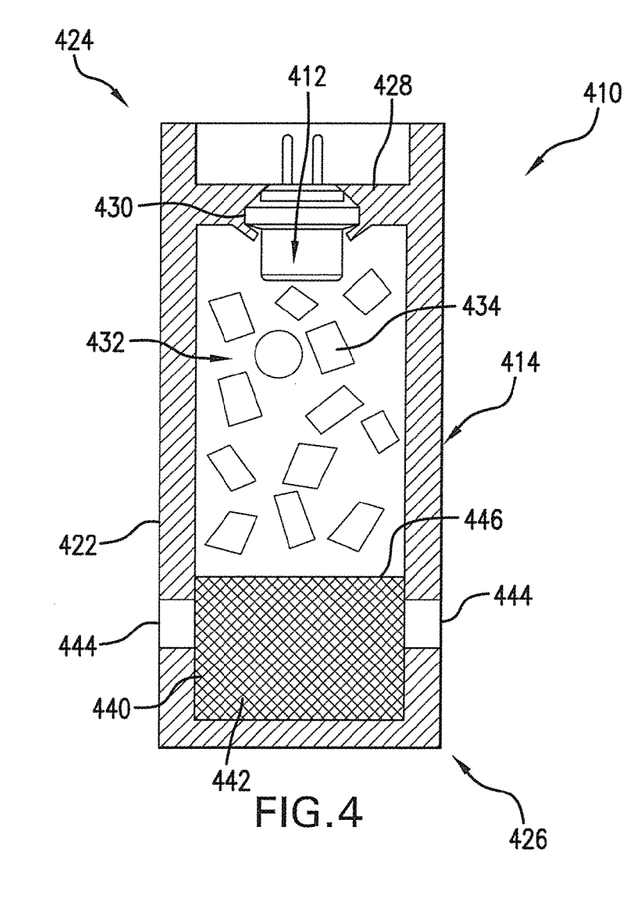
FIG. 4 is a simplified sectional view of an automotive safety restraint inflator device incorporating an initiator assembly in accordance with another embodiment of the invention.
Figure 5:
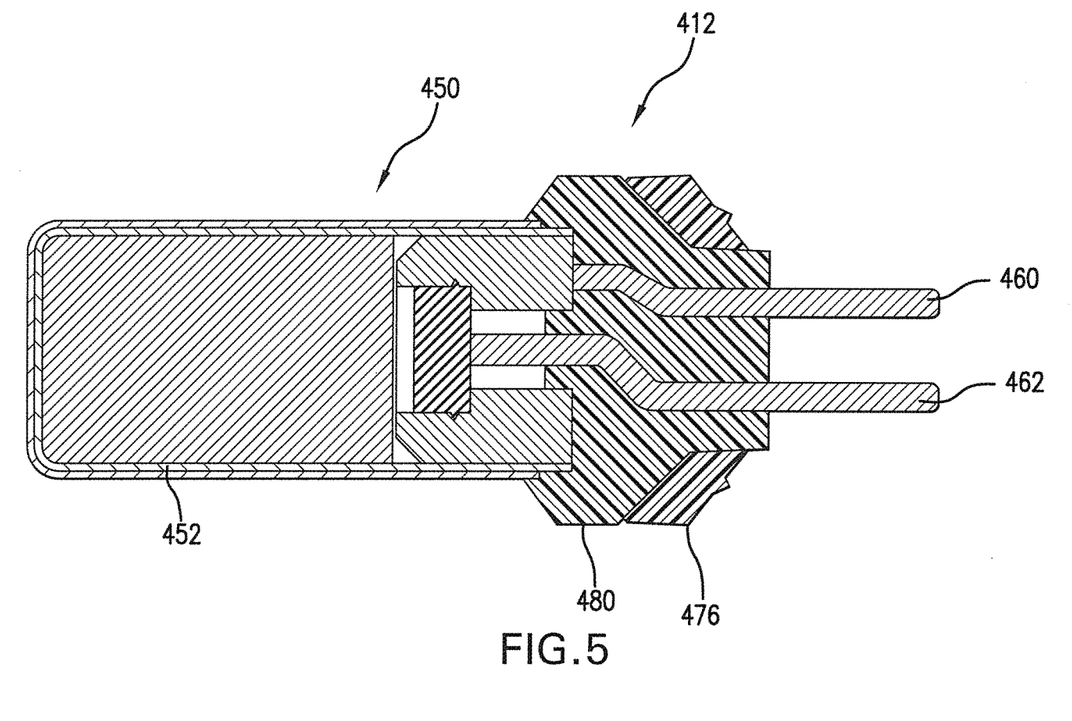
FIG. 5 is a simplified sectional side view of the initiator assembly of automotive safety restraint inflator device shown in FIG. 4.

Turning now to FIG. 4 there is illustrated an automotive safety restraint inflator device, generally designated by the reference numeral 410, incorporating an initiator assembly, generally designated by the reference numeral 412 and shown in more particular detail in FIG. 5, in accordance with one embodiment of the invention. As described in greater below, the initiator assembly 412 incorporates an initiator device of a type that is sometimes hereinafter referred to as a Pin Style Initiator.

The automotive safety restraint inflator device 410 is of a type commonly referred to as a pyrotechnic inflator. Such an inflator device commonly is generally composed of a housing 414, such as in the form of a cylinder 422 having first and second opposite ends 424 and 426. The first end 424 includes an end wall 428 having an opening 430 wherein the inflator assembly 412 is disposed in sealing relation.

The housing 414 forms a gas generant chamber 432 wherein a selected quantity of a gas generant material 434, such as known in the art and such as commonly in the form of a solid, can be stored and upon actuation of the inflator device 410, react to produce gas. Adjacent the gas generant chamber 432 is an inflation gas treatment chamber 440 such as contains a quantity of one or more inflation gas treatment materials, generally designated by the reference numeral 442, such as known in the art and such as whereby gas produced by or within the inflator device 410 can be appropriately treated prior to passage out of the inflator device 410, such as through the outlet ports 444. In particular applications, appropriate treatment of the inflation gas can, for example, include cooling and/or filtration. In an at rest state, prior to inflator device actuation, the gas generant chamber 432 and the gas generant material 434 therein contained can be desirably isolated and separated from the inflation gas treatment chamber 440 by a rupturable wall or separator 446.

The initiator assembly 412 will now be more particularly described making reference to FIG. 5.

The initiator assembly 412 includes an initiator device 450. As identified above, the initiator device 450 is of a type that is sometimes hereinafter referred to as a Pin Style Initiator. Similar to the initiator 50 described above, the initiator device 450 includes an initiator canister or cup 452 that at least in part defines a storage chamber for containing at least one reactive charge. The initiator device 450 includes at least one igniter element and first and second electrical connectors 460 and 462 in reaction initiating communication with the reactive charge within the initiator canister. Upon receiving a signal through the electrical connectors 460 and 462, the reactive charge is initiated to produce reaction products that desirably rupture the initiator canister 452.

The initiator assembly 412 includes an elastomeric overmoulding 476. As shown, the elastomeric overmoulding 476 can desirably be molded onto a thermoplastic base portion 480 of the initiator device 450. The elastomeric overmoulding desirably forms or creates a molded seal material about the initiator assembly 412 such that upon placement in an inflator device, such as the inflator device 410 shown in FIG. 4, the initiator assembly 412 is sealingly mated in the initiator-accepting opening 430 in the inflator device 410.

Figure 6:
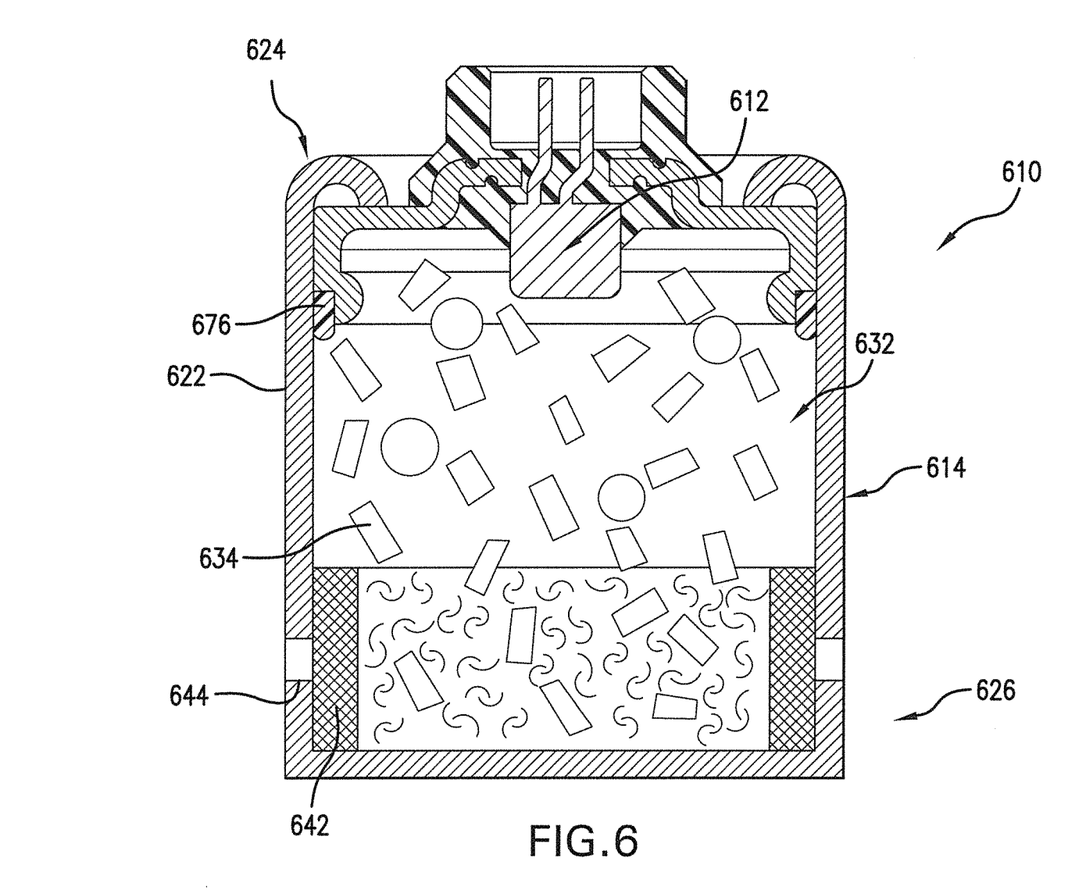
FIG. 6 is a simplified sectional view of an automotive safety restraint inflator device incorporating an initiator assembly in accordance with another embodiment of the invention.
Figure 7:
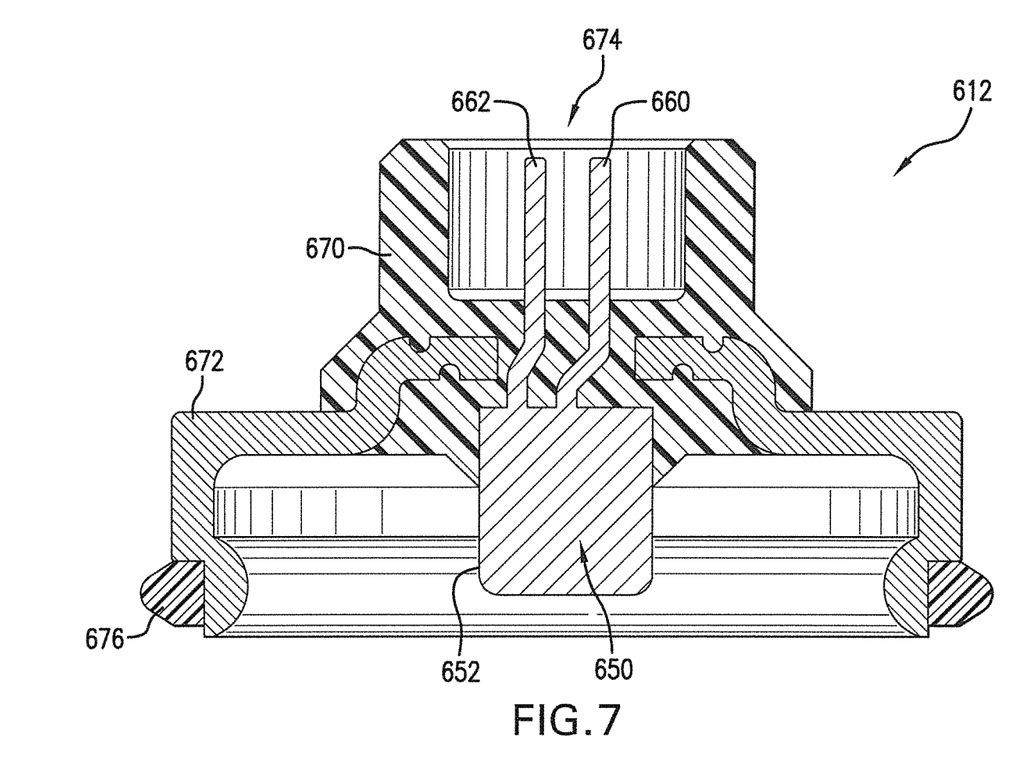
FIG. 7 is a simplified sectional side view of the initiator assembly of automotive safety restraint inflator device shown in FIG. 6.

Turning now to FIG. 6 there is illustrated an automotive safety restraint inflator device, generally designated by the reference numeral 610, incorporating an initiator assembly, generally designated by the reference numeral 612 and shown in more particular detail in FIG. 7, in accordance with one embodiment of the invention. As described in greater below, the initiator assembly 612 incorporates an initiator device of a type that is sometimes hereinafter referred to as a Molded In Base (MIB) Initiator.

The inflator device 610, similar to the inflator device 410 described above, is of a type commonly referred to as a pyrotechnic inflator. Such an inflator device commonly is generally composed of a housing 614, such as in the form of a cylinder 622 having first and second opposite ends 624 and 626. The first end 624 is appropriately shaped to hold or secure the initiator assembly 612 in sealing relation with the housing cylinder 622.

The housing 614 forms a gas generant chamber 632 wherein a selected quantity of a gas generant material 634, such as known in the art, can be stored and upon actuation of the inflator device 610, react to produce gas. Adjacent the housing second end 626 are one or more outlet ports 644. Within the housing 614, adjacent the outlet ports 644 there is disposed a quantity of one or more inflation gas treatment materials, generally designated by the reference numeral 642, such as known in the art and such as whereby gas produced by or within the inflator device 610 can be appropriately treated prior to passage out of the inflator device 610, such as through the outlet ports 644. In particular applications, appropriate treatment of the inflation gas can, for example, include cooling and/or filtration.

The initiator assembly 612 will now be more particularly described making reference to FIG. 7.

The initiator assembly 612 includes an initiator device 650. As identified above, the initiator device 650 is of a type that is sometimes hereinafter referred to as a Molded In Base (MIB) Initiator. Similar to the initiator 50 described above, the initiator device 650 includes an initiator canister or cup 652 that at least in part defines a storage chamber for containing at least one reactive charge. The initiator device 650 includes at least one igniter element and first and second electrical connectors 660 and 662 in reaction initiating communication with the reactive charge within the initiator canister. Upon receiving a signal through the electrical connectors 660 and 662, the reactive charge is initiated to produce reaction products that desirably rupture the initiator canister 652.

The initiator device 650 includes a thermoplastic adapter portion 670 integrally molded to or with a metallic base or body 672. The thermoplastic adapter portion can form or include a connector socket opening 674 such as to permit or facilitate appropriate connection or attachment with a selected electrical signal conveyance device. In the initiator assembly 612, the metallic base or body 672 forms at least a portion of a base or end closure for the inflator device 610.

The initiator assembly 612 includes an elastomeric overmoulding 676. As shown, the elastomeric overmoulding 676 can desirably also be molded onto an inflator device base or end closure 672.

As perhaps best seen by reference to FIG. 6, in the inflator device 610, the elastomeric overmoulding 676 desirably forms or creates a molded seal material about the inflator device base or end closure 672.

Those guided by the teachings herein provided will understand and appreciate that the elastomeric overmoulding of the invention and the resulting integral inclusion of a molded seal desirably dramatically simplifies and facilitates manufacture and production. For example, with the prior use and inclusion of a separate O-ring seal, the handling, placement and proper retaining in place of a separate O-ring seal can be especially problematic, particularly in or with high volume production environments such as commonly associated with the manufacture and production of automotive safety restraint inflator devices.

It can be beneficial to select elastomeric overmoulding materials from the TPE, TPV, LSR and EPDM families that have lower "compression set". For example, the compressed shape of the seal can be designed to fill the sealing area to a partial, full, or over full extent depending on further design considerations. The inclusion and use of an integrally molded-on seal desirably solves the problem of proper placement of the seal in high volume manufacturing situations. Furthermore, the proper selection of the seal material also allows for the design of hermetic sealing that can withstand aging and remain well sealed during an extended life and over various severe environmental conditions, such as to which automotive safety restraint inflator device may possibly be subjected. The subject seal can also desirably serve as a ballistic seal when subjected to pressure from an internal (to an inflator) pressure source. It can therefore be important in many applications to secure or otherwise properly "capture" the seal in a desired sealing position to prevent extrusion of the seal during or on the occurrence of a ballistic or pressurization event. As will be appreciated, such proper securement or capture can be realized or otherwise attained by or via the appropriate mating of parts.

While various particular initiator assemblies in accordance with the subject development have been described above, another aspect of the subject development regards methods of or for making such initiator assemblies. As will be appreciated by those skilled in the art and guided by the teachings herein provide, such methods can desirably involve the molding of an elastomeric seal about at least a portion of an outer surface of an initiator assembly structural element such that the elastomeric seal serves to sealingly mate the initiator assembly in an initiator-accepting opening in an initiator-containing device.

Thus, one significant aspect of the subject development, is the providing of initiator assemblies, particularly improved initiator assemblies wherein a seal such as of an elastomeric material (such as a thermoplastic elastomer (TPE), or a thermoplastic vulcanizate (TPV), or a react in mold material such as: a liquid silicon rubber (LSR), ethelyne propylene diene monomer (EPDM), for example) is molded onto an initiator-containing component such as to provide a soft surface such as to one or more of provide, permit and/or facilitate the initiator-containing component to sealingly mate in or with a corresponding initiator-accepting opening in a initiator-containing device. Thus, in contrast to previous initiator configurations which require the inclusion or addition of a secondary seal, such as in the form of an O-ring, to be used in association with the initiator configuration when used in an inflator device, the subject development desirably provides a seal material that is integral with the initiator-containing component such that no secondary seal placement is required when the assembly is incorporated into a corresponding or associated initiator-containing device, such as an automotive safety restraint inflator device, for example.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An initiator assembly for an initiator-containing device, the initiator assembly comprising:
   an initiator device including at least one igniter element, the initiator device having at least one element selected from the group consisting of a thermoplastic initiator base and a thermoplastic adapter integrally joined to a base of the initiator-containing device and an elastomeric overmoulding to sealingly mate the initiator assembly in an initiator-accepting opening directly to a gas storage or generation chamber in the initiator-containing device, the elastomeric overmoulding integral with at least one structural component selected from a group consisting of said thermoplastic initiator base, said thermoplastic adapter and said base of the initiator-containing device, the elastomeric overmoulding at least in part disposed on an outer surface of the selected structural component.

2. The initiator assembly of claim 1 wherein the outer surface of the selected structural component whereat the elastomeric overmoulding is disposed at least in part comprises a thermoplastic material.

3. The initiator assembly of claim 1 wherein the outer surface of the selected structural component whereat the elastomeric overmoulding is disposed at least in part comprises a metal material.

4. The initiator assembly of claim 1 wherein the elastomeric overmoulding comprises a thermoplastic elastomer.

5. The initiator assembly of claim 1 wherein the elastomeric overmoulding comprises a thermoplastic vulcanizate.

6. The initiator assembly of claim 1 wherein the elastomeric overmoulding comprises a react in mold material.

7. The initiator assembly of claim 1 wherein the at least one structural component with which said elastomeric overmoulding is integral is said thermoplastic initiator base.

8. The initiator assembly of claim 7 wherein said initiator device comprises a pin style initiator.

9. The initiator assembly of claim 1 wherein the at least one structural component with which said elastomeric overmoulding is integral is said thermoplastic adapter.

10. The initiator assembly of claim 9 wherein said initiator device comprises an integrally molded initiator.

11. The initiator assembly of claim 1 wherein the at least one structural component with which said elastomeric overmoulding is integral is said base of the initiator containing device.

12. The initiator assembly of claim 11 wherein said initiator device comprises a molded in base initiator.

13. The initiator assembly of claim 1 wherein the initiator-containing device comprises an automotive safety restraint inflator device.

14. The initiator assembly of claim 13 wherein said automotive safety restraint inflator device contains a quantity of stored inflation gas.

15. The initiator assembly of claim 13 wherein said automotive safety restraint inflator device contains a quantity of solid gas generant material.

16. In an initiator assembly for placement in an initiator-containing automotive safety restraint inflator device, the initiator assembly including at least one igniter element and a structural element having an outer surface, the improvement comprising:

an integral elastomeric overmoulding disposed on at least a portion of the outer surface of the structural element to form a seal to sealingly mate the initiator assembly in an initiator-accepting opening directly to a gas storage or generation chamber in the inflator device.

17. The initiator assembly of claim 16 wherein the outer surface of the selected structural component whereat the elastomeric overmoulding is disposed at least in part comprises a thermoplastic material.

18. The initiator assembly of claim 16 wherein the outer surface of the selected structural component whereat the elastomeric overmoulding is disposed at least in part comprises a metal material.

19. The initiator assembly of claim 16 wherein the initiator accepting opening is disposed in a base of the inflator device.

20. A method of making an initiator assembly, the method comprising:

molding an elastomeric seal about at least a portion of an outer surface of an initiator assembly structural element, the elastomeric seal to sealingly mate the initiator assembly in an initiator accepting opening directly to a gas storage or generation chamber in an initiator containing device.

* * * * *